United States Patent [19]

Thompson

[11] 4,038,101

[45] * July 26, 1977

[54] REACTIVE PIGMENTS AND METHODS OF PRODUCING THE SAME

[75] Inventor: Thomas D. Thompson, Flemington, N.J.

[73] Assignee: Yara Engineering Corporation, Elizabeth, N.J.

[ * ] Notice: The portion of the term of this patent subsequent to Sept. 14, 1993, has been disclaimed.

[21] Appl. No.: 683,077

[22] Filed: May 4, 1976

Related U.S. Application Data

[63] Continuation-in-part of Ser. No. 586,558, June 13, 1975, Pat. No. 3,980,492.

[51] Int. Cl.² .......................... C09C 1/42; B41M 5/22
[52] U.S. Cl. .................................. 106/308 N; 427/150; 106/288 B; 106/308 Q; 106/288 Q

[58] Field of Search .................. 106/308 N, 72, 288 Q, 106/288 B; 427/150

[56] References Cited

U.S. PATENT DOCUMENTS

| | | | |
|---|---|---|---|
| 3,211,565 | 10/1965 | Bundy | 106/72 |
| 3,753,761 | 8/1973 | Sugahara et al. | 106/288 B |
| 3,862,027 | 1/1975 | Mercade | 106/288 B |
| 3,924,027 | 12/1975 | Saito et al. | 427/150 |
| 3,980,492 | 9/1976 | Thompson | 106/308 N |

*Primary Examiner*—Winston A. Douglas
*Assistant Examiner*—J. V. Howard
*Attorney, Agent, or Firm*—Buell, Blenko & Ziesenheim

[57] ABSTRACT

Reactive pigments and methods of producing the same for use in manifold copy systems is provided in which a member from the group consisting of bentonite and montmorillonite is admixed with kaolinite, added to an aqueous solution of a polyvalent cation, a ligand is added and the solids separated, dried and pulverized.

15 Claims, No Drawings

REACTIVE PIGMENTS AND METHODS OF PRODUCING THE SAME

This application is a continuation-in-part of my copending application Ser. No. 586,558, filed June 13, 1975 now U.S. Pat. No. 3,980,492 issued Sept. 14, 1976.

This invention relates to methods of producing reactive pigments and particularly to the production of pigments for use in pressure sensitive record materials.

The use of pigments in paper coatings for manifold copy systems is not in itself new. Such manifold copy systems have, however, been based upon the use of oxidizing clays and special acid leached bentonites as the basis for the pigment. Such systems are disclosed in U.S. Pat. No.s 3,753,761; 3,622,364; 3,565,653; 3,455,721; 2,712,507; 2,730,456; 3,226,252; 3,293,060 and Canadian Pat. No. 780,254.

These pressure sensitive record materials are frequently termed "carbonless carbon papers" and are, in general, highly successful in reproducing copies.

The present invention provides a marked improvement over these prior art pressure sensitive record materials. It provides an excellent dye development and light fastness without the necessity of an acid leached bentonite. It provides improved intensity of dye development as compared with present pigments. Improved rheology in the coating mixture results so that it can be coated at high solids on a blade coater. It provides sufficient flexibility so that both image intensity and color can be varied and controlled to a degree unthought of with prior art materials. Finally, but not least in importance, improved coated sheet properties such as brightness, whiteness index, opacity, smoothness and gloss are obtained.

The improved reactive pigments of this invention comprise in combination a metal ion or proton, a ligand, a bentonite or montmorillonite and a kaolinite. The preferred metal ion is copper derived from $CuCl_2$. The preferred ligand is 1,6-hexanediamine. Other metal ions and protons may be used, e.g. Ba, Cd, Cr, Fe, Co, Li, Mn, Ni, Sn, Zn, Na and Al preferably as a mineral acid salt such as the chloride or a proton such as $H^+$ derived from HCl, $H_2SO_4$, acetic acid, citric acid, boric acid, tartaric acid, $HNO_3$, $H_3PO_4$. The same is true of the ligand, where other ligands such as gluconic acid, isostearic acid, sodium dimethyl dithiocarbamate, and others may be used. The term bentonite is used generically to describe the unrefined rock from which montmorillonite, a swelling clay, is fractionated.

The process of producing such reactive pigment is illustrated in the following example:

EXAMPLE I

Forty-five grams of montmorillonite (or bentonite) is combined with 135 g. of kaolinite and dispersed in 900 g. water. To this mixture, 1.98 g. $CuCl_2$ in 50 g. $H_2O$ is added and allowed to stir for 15 minutes, at which time 1.80 g. 1,6-hexanediamine in 50 g. $H_2O$ is added and allowed to stir for an additional 30 minutes. The slurry is then filtered and dried at 90° C. overnight. The dried filter cake is pulverized three times on a Mikro Sampmill.

The above procedure can be illustrated as follows:

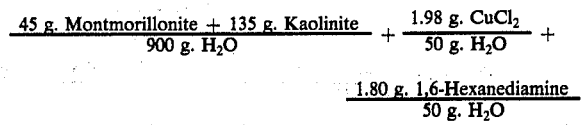

Various reactive pigments were prepared using different metal ions, different ligands, different bentonites and kaolins.

The various reactive pigments were evaluated using the following coating formulation:

In a 200 ml. tall beaker, place 65 ml. water and (0.5%) 0.40 g. Calgon (sodium hexametaphosphate). Place on Hamilton Beach mixer and mix to dissolve Calgon. Add pigment slowly until all pigment is incorporated and blunge for 5 minutes. At this point, clay-water viscosity measurements can be taken.

To the clay-water dispersion, 19.5 g. Dow Latex 638 is added and mixed on a low speed mixer for 5 minutes. At this point, the coating color viscosity measurements are taken. Hand sheets are made using a blade applicator. The coat weight on the hand sheet was 3.0 lbs./ream ($3300^2$ ft.).

The hand sheets were evaluated for image intensity and color using a Spectronic 505. The image intensity is recorded as the optical density at 6140 A on the developed sheet minus the optical density at 6140 A on the undeveloped sheet. The hand sheets were developed first by calendering the sheet using only the pressure of the rolls and then passing the sheets through a second time with a 2 inch square of CB sheet taped on top of the hand sheet or CF sheet. The CB sheet is coated on the backside with microcapsules containing dye precursor of the following types:

TYPE I DYES

Colorless dyes which develop intense colors immediately upon contact with Bronsted acid-and/or Lewis acid-type substrates. The color development is influenced by environmental pH and/or polarization of the dye. Examples of type I dyes are crystal violet lactone and other triarylmethane dyes, such as malachite green lactone. Michler's ketone and Michler's hydrol as well as other diphenylmethanes are also examples of type I dyes.

TYPE II DYES

Colorless dyes which do not immediately develop an intense color upon contact with a reactive pigment, but, with time, an intense color will develop by means of oxidation and/or an electron transfer mechanism. Examples of the type II dyes are thiazines, such as benzoyl leuco-methylene blue, and triarylmethane, such as leuco-crystal violet and leuco-malachite green.

The optical density data reported in the following examples were based on a diphenylmethane type I dye precursor. The brightness and whiteness index were measured in accordance to the TAPPI procedures. Redness is the ratio of the optical density at 5300 A to the optical density at 6140 A times 100. The redness of the image is of importance because a red image will xerox better than a blue image.

The effect of changing metal ions and proton sources on the reactive pigment is set out in Tables I and II below:

TABLE I
Effect of Metal Ions $$\frac{45 \text{ g. Montmorillonite} + 135 \text{ g. Kaolinite}}{900 \text{ g. } H_2O} + \frac{X \text{ g. } MeCl_2}{50 \text{ g. } H_2O} + \frac{0.9 \text{ g. 1,6-Hexanediamine}}{50 \text{ g. } H_2O}$$

| | BROOKFIELD Viscosity (cpe) | | HERCULES | OPTICAL DENSITY | % |
|---|---|---|---|---|---|
| | 10 RPM | 100 | dynes | 1 Hour | Redness |
| 1. 3.96 g. $CrCl_3 \cdot 6 H_2O$ | 180 | 86 | 6.5 | 0.683 | 52.0 |
| 2. 3.96 g. $FeCl_3 \cdot 6 H_2O$ | 1720 | 236 | 0.9 | 0.747 | 43.6 |
| 3. 3.50 g. $CoCl_2 \cdot 6 H_2O$ | 180 | 80 | 0.6 | 0.713 | 44.7 |
| 4. 3.50 g. $NiCl_2 \cdot 6 H_2O$ | 200 | 80 | 0.6 | 0.691 | 47.0 |
| 5. 1.98 g. $CuCl_2$ | 180 | 64 | 0.7 | 0.642 | 39.2 |
| 6. 1.98 g. $ZnCl_2$ | 260 | 112 | 0.6 | 0.686 | 44.9 |
| 7. 0.99 g. $ZnCl_2$ + 0.99 g. $CuCl_2$ | 80 | 56 | 0.5 | 0.720 | 40.1 |
| 8. 9.90 g. $Al_2(SO_4) \cdot 18 H_2O$ | 100 | 68 | 0.6 | 0.680 | 32.1 |
| 9. 3.60 g. $CuSO_4 \cdot 5 H_2O$ | 80 | 64 | 0.8 | 0.667 | 40.5 |
| 10. 1.81 g. $CaCl_2 \cdot 2 H_2O$ | 880 | 296 | 1.7 | 0.642 | 33.6 |

TABLE II
Preparation of Carbonless Carbon Pigments

| % Metal Salt | | % 1,6 Hexanediamine | Optical Density |
|---|---|---|---|
| $CrCl_3 \cdot 6 H_2O$ | 1.45% | 0.5 | 0.758 |
| $CoCl_2 \cdot 6 H_2O$ | 1.59% | 0.5 | 0.807 |
| $NiCl_2 \cdot 6 H_2O$ | 1.24% | 0.5 | 0.765 |
| $MnCl_2 \cdot 4 H_2O$ | 1.03% | 0.5 | 0.922 |
| $FeSO_4 \cdot 7 H_2O$ | 1.03% | 0.5 | 0.753 |
| $SnCl_2 \cdot 2 H_2O$ | 1.51% | 0.5 | 0.879 |
| $SnCl_4 \cdot 5 H_2O$ | 1.43% | 0.5 | 0.903 |
| LiCl | 0.57% | 0.5 | 0.901 |
| $ZnSO_4 \cdot 4 H_2O$ | 1.19% | 0.5 | 0.881 |
| NaCl | 0.78% | 0.5 | 0.908 |
| HCl | 0.71% | 0.5 | 0.940 |
| $H_2SO_4$ | 0.95% | 0.5 | 0.987 |
| KCl | 1.00% | 0.5 | 0.833 |
| $BaCl_2$ | 2.36% | 0.5 | 0.838 |
| $MgCl_2 \cdot 6 H_2O$ | 1.66% | 0.5 | 0.854 |
| $CdCl_2$ | 1.53% | 0.5 | 0.842 |
| Acetic Acid | 1.16% | 0.5 | 0.751 |
| $H_3PO_4$ | 0.63% | 0.5 | 0.740 |
| $HNO_3$ | 1.22% | 0.5 | 0.748 |
| Citric Acid | 1.36% | 0.5 | 0.744 |
| Tartaric Acid | 1.45% | 0.5 | 0.754 |
| Boric Acid | 0.40% | 0.5 | 0.730 |
| $VOSO_4$ | 1.93% | 0.5 | 0.719 |
| CONTROL Acid Leached Clay | | | 0.578 |

As shown in Table I, the metal ion is capable of effecting the rheology, image intensity, and image color or redness.

The effect of varying the metal ion or proton source is shown in Table II.

The effect of varying the ligand composition is set out in Table III.

TABLE III
Effect of Ligands $$\frac{45 \text{ g. Montmorillonite} + 135 \text{ g. Kaolinite}}{900 \text{ g. } H_2O} + \frac{1.98 \text{ g. } CuCl_2}{50 \text{ g. } H_2O} + \frac{X \text{ g. Ligand}}{50 \text{ g. } H_2O}$$

| Sample | BROOKFIELD Viscosity (cpe) | | HERCULES | Optical Density | % |
|---|---|---|---|---|---|
| | 10 RPM | 100 | dynes | 1 Hour | Redness |
| 2.25 g. Tartaric Acid | 19,200 | 3360 | — | 0.677 | 67.7 |
| 1.80 g. 1,6-Hexanediamine | 60 | 46 | 0.9 | 0.663 | 44.9 |
| 5.58 g. Gluconic Acid | 1040 | 328 | 1.8 | 0.568 | 56.7 |
| 3.96 g. Isostearic Acid | 880 | 252 | 1.7 | 0.612 | 44.6 |
| 0.25 g. Sodium Dimethyl Dithio-carbamate | 2760 | 712 | 2.3 | 0.548 | 54.9 |
| 0.77 g. 2-4 Pentanedione | 700 | 260 | 2.4 | 0.744 | 53.2 |
| 1.13 g. Adipic Acid | 1300 | 460 | 3.7 | 0.702 | 58.4 |
| 0.69 g. B Alinine | 560 | 240 | 2.9 | 0.728 | 50.1 |
| 1.04 g. DL-Aspartic Acid pH = 3.0 | 32,000 | 3840 | 6.0 | 0.667 | 55.0 |
| 1.04 g. DL-Aspartic Acid pH = 4.6 | 1,260 | 472 | 5.4 | 0.696 | 46.0 |
| 1.04 g. DL-Aspartic Acid pH = 6.3 | 900 | 368 | 4.3 | 0.670 | 39.7 |
| 0.73 g. 2 Aminopyridine | 80 | 68 | 1.6 | 0.677 | 49.5 |
| 1.91 g. Aminoguanidine Sulfate | 200 | 104 | 2.4 | 0.706 | 42.1 |
| 1.41 g. 4-Nitroanthanilic Acid | 230 | 120 | 2.3 | 0.689 | 56.6 |
| 0.84 g. 2-Amino-6-Methyl Pyridine | 40 | 50 | 1.2 | 0.718 | 46.5 |
| 0.92 g. Benzimidazole | 80 | 72 | 1.5 | 0.701 | 45.8 |

The influence of the ligand is primarily on the rheological properties. There appears to be no correlation between rheology and imaging intensity and image color or redness.

The effect of varying the concentration of the preferred ligand is set out in Table IV.

TABLE IV
Effect of 1,6-Hexanediamine Content $$\frac{45 \text{ g. Montmorillonite} + 135 \text{ g. Calcined Kaolinite}}{900 \text{ g. } H_2O} + \frac{1.62 \text{ g. } CuCl_2}{50 \text{ g. } H_2O} + \frac{X \text{ g. 1,6-Hexanediamine}}{50 \text{ g. } H_2O}$$

| 1,6-Hexane-diamine | BROOKFIELD Viscosity (cpe) | | Hercules | Optical Density | % |
|---|---|---|---|---|---|
| | 10 RPM | 100 | dynes | 1 hour | Redness |
| 0.00 g. | 1920 | 725 | 3.4 | 0.592 | 48.6 |
| 0.36 g. | 720 | 272 | 1.7 | 0.922 | 53.7 |
| 0.72 g. | 240 | 124 | 1.4 | 0.907 | 45.5 |
| 1.08 g. | 60 | 52 | 0.7 | 0.872 | 35.2 |
| 1.44 g. | 30 | 52 | 0.5 | 0.733 | 31.0 |
| 1.80 g. | 30 | 44 | 0.4 | 0.674 | 27.9 |
| 1.62 g. | 10 | 36 | 0.4 | 0.563 | 26.1 |

The redness is greatest with 0.36 g. 1,6-Hexanediamine per 180 g. pigment (0.2%), as well as the highest image intensity. The rheology is substantially improved over that of the acid leached bentonites.

The effect of different extender pigments on the reactive pigment is illustrated in Table V.

TABLE V

Effect of Different Kaolinites and Calcium Carbonate

$$\frac{45 \text{ g. Montmorillonite} + 135 \text{ g. Extender}}{900 \text{ g. H}_2\text{O}} + \frac{1.98 \text{ g. CuCl}_2}{50 \text{ g. H}_2\text{O}} + \frac{0.9 \text{ g. 1,6-Hexanediamine}}{50 \text{ g. H}_2\text{O}}$$

| Sample | BROOKFIELD Viscosity (cpe) 10 RPM | BROOKFIELD Viscosity (cpe) 100 | Hercules dynes | Optical Density 1 hour | % Redness |
|---|---|---|---|---|---|
| Premax | 40 | 46 | 0.6 | 0.713 | 40.0 |
| KCS | 60 | 52 | 0.6 | 0.678 | 39.2 |
| WP | 80 | 64 | 0.6 | 0.711 | 40.2 |
| Astra Plate | 100 | 72 | 1.0 | 0.734 | 39.5 |
| Glomax PJD | 40 | 52 | 0.8 | 0.829 | 37.0 |
| Glomax JD | 40 | 52 | 0.8 | 0.858 | 41.8 |
| Atomite | 60 | 60 | 0.6 | 0.591 | 35.0 |

This Table shows that extender pigments, such as hydrous kaolinites, calcined kaolinites, and calcium carbonate, exert only minor influence on rheological properties, but drastically influence image intensity. The calcined clays give the greatest improvement in image intensity.

In Table VI the effect of different bentonites or montmorillonites is set out.

TABLE VI

Effect of Different Bentonites or Montmorillonites

$$\frac{45 \text{ g. Montmorillonite} + 135 \text{ g. Kaolinite}}{900 \text{ g. H}_2\text{O}} + \frac{1.98 \text{ g. CuCl}_2}{50 \text{ g. H}_2\text{O}} + \frac{1.80 \text{ g. 1,6-Hexanediamine}}{50 \text{ g. H}_2\text{O}}$$

| Sample | BROOKFIELD Viscosity (cpe) 10 RPM | BROOKFIELD Viscosity (cpe) 100 | Hercules dynes | Optical Density 1 hour | % Redness |
|---|---|---|---|---|---|
| Gelwhite | 60 | 46 | 0.9 | 0.663 | 44.9 |
| K-4 | 20 | 44 | 0.2 | 0.698 | 32.4 |
| K-2 | 10 | 38 | 0.4 | 0.768 | 32.0 |
| 910 | 60 | 56 | 0.8 | 0.638 | 30.7 |
| Mississippi | 20 | 36 | 0.4 | 0.400 | 32.5 |

The Gelwhite sample has the greatest redness which would Xerox better than the other bentonite samples. Improved Xerox capability means that a sample with greater redness will be reproduced with equal intensity even though its image intensity may be lower than that of a blue sample. The term bentonite is used to refer to a rock, while the term montmorillonite refers to a type of swelling clay recovered by means of fractionating a bentonite. Experiments were carried out using both bentonite and montmorillonite showing that the rheology, image intensity, and image color were the same. Only the amount of grit in the final samples varied. When the bentonite was used, greater grit or 325 mesh residue was obtained.

The variations of bentonite content and its effect on the reactive pigment are shown in Tables VIIa and VIIb.

TABLE VIIa

Effect of Bentonite Content

$$\frac{X \text{ g. Bentonite} + Y \text{ g. Kaolinite}}{900 \text{ g. H}_2\text{O}} + \frac{1.98 \text{ g. CuCl}_2}{50 \text{ g. H}_2\text{O}} + \frac{0.9 \text{ g. 1,6-Hexanediamine}}{50 \text{ g. H}_2\text{O}}$$

| Samples | BROOKFIELD Viscosity (cpe) 10 RPM | BROOKFIELD Viscosity (cpe) 100 | Hercules dynes | Optical Density 1 Hour | % Redness |
|---|---|---|---|---|---|
| 15%  27 g. Bentonite 85% 153 g. Kaolinite | 30 | 40 | 0.4 | 0.617 | 30.1 |
| 20%  36 g. Bentonite 80% 144 g. Kaolinite | 120 | 64 | 0.7 | 0.655 | 34.4 |
| 25%  45 g. Bentonite 75% 135 g. Kaolinite | 300 | 128 | 1.1 | 0.664 | 38.2 |
| 30%  54 g. Bentonite 70% 126 g. Kaolinite | 2120 | 690 | 2.9 | 0.634 | 38.2 |
| 35%  63 g. Bentonite 65% 117 g. Kaolinite | 5120 | 1600 | 5.2 | 0.609 | 38.8 |

TABLE VIIb

Effect of Montmorillonite Content

$$\frac{X \text{ g. Montmorillonite} + Y \text{ g. Calcined Kaolinite}}{900 \text{ g. H}_2\text{O}} + \frac{1.98 \text{ g. CuCl}_2}{50 \text{ g. H}_2\text{O}} + \frac{0.9 \text{ g. 1,6-Hexanediamine}}{50 \text{ g. H}_2\text{O}}$$

| Samples | BROOKFIELD Viscosity (cpe) 10 RPM | BROOKFIELD Viscosity (cpe) 100 | Hercules dynes | Optical Density 1 Hour | % Redness 1 Hour |
|---|---|---|---|---|---|
| 25% Montmorillonite 75% Calcined Kaolinite | 420 | 198 | 2.2 | 0.807 | 52.3 |
| 20% Montmorillonite 80% Calcined Kaolinite | 140 | 84 | 1.4 | 0.804 | 47.0 |
| 15% Montmorillonite 85% Calcined Kaolinite | 40 | 46 | 0.6 | 0.780 | 39.1 |
| 10% Montmorillonite | 20 | 40 | 0.3 | 0.572 | 32.3 |

TABLE VIIb-continued
Effect of Montmorillonite Content

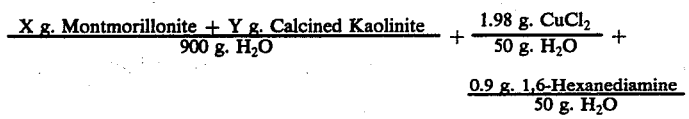

$$\frac{X \text{ g. Montmorillonite} + Y \text{ g. Calcined Kaolinite}}{900 \text{ g. } H_2O} + \frac{1.98 \text{ g. } CuCl_2}{50 \text{ g. } H_2O} +$$

$$\frac{0.9 \text{ g. 1,6-Hexanediamine}}{50 \text{ g. } H_2O}$$

| Samples | BROOKFIELD Viscosity (cpe) 10 RPM 100 | | Hercules dynes | Optical Density 1 Hour | % Redness 1 Hour |
|---|---|---|---|---|---|
| 90% Calcined Kaolinite | | | | | |

The bentonite was fractionated by sedimentation in order to remove everything greater than 5 microns, thereby resulting in a montmorillonite.

Tables VIIa and VIIb show that the optimum amount of bentonite with regard to image intensity was obtained with 25% bentonite and 75% kaolinite.

In order to show the improved properties of the reactive pigment as compared with acid leached bentonites, several samples of each were examined in detail with regard to image intensity, image color and rheology.

The aqueous viscosity and coating color viscosity data were obtained on compositions similar to those of the new reactive pigment of this invention but were made down at 45% solids instead of 60% solids.

TABLE VIII
Clay - Water Viscosity

| Sample | Dispersing Agent | % D.A. | % Solids | cpe Brookfield 10 RPM 100 | | Hercules | |
|---|---|---|---|---|---|---|---|
| MBF 530 | Calgon | 6.8 | 45 | 2920 | 1144 | 12.5 | dynes |
| MBF 530 | Dispex N-40 | 4.4 | 45 | 4640 | 1808 | 15.6 | dynes |
| Silton | Calgon | 3.5 | 45 | 180 | 148 | 5.0 | dynes |
| *Reactive Pigment No. 1 | Calgon | 0.5 | 62 | 7000 | 1640 | 775 | rpm |
| Reactive Pigment No. 1 | Dispex N-40 | 0.53 | 62 | 4320 | 1412 | 560 | rpm |
| **Reactive Pigment No. 2 | Calgon | 0.5 | 62 | 700 | 193 | 14.5 | dynes |
| Reactive Pigment No. 2 | Dispex N-40 | 0.53 | 62 | 900 | 280 | 13.2 | dynes |

*Reactive Pigment No. 1

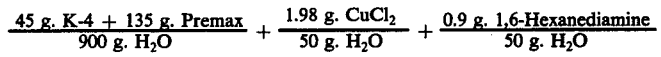

$$\frac{45 \text{ g. K-4} + 135 \text{ g. Premax}}{900 \text{ g. } H_2O} + \frac{1.98 \text{ g. } CuCl_2}{50 \text{ g. } H_2O} + \frac{0.9 \text{ g. 1,6-Hexanediamine}}{50 \text{ g. } H_2O}$$

**Reactive Pigment No. 2

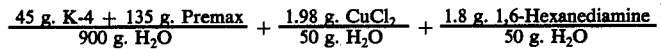

$$\frac{45 \text{ g. K-4} + 135 \text{ g. Premax}}{900 \text{ g. } H_2O} + \frac{1.98 \text{ g. } CuCl_2}{50 \text{ g. } H_2O} + \frac{1.8 \text{ g. 1,6-Hexanediamine}}{50 \text{ g. } H_2O}$$

TABLE IX
Coating Color Viscosity

| Sample | Dispersing Agent | % D.A. | % Solids | Brookfield Viscosity (cpe) 10 rpm | 100 rpm | Hercules |
|---|---|---|---|---|---|---|
| MBF 530 | Calgon | 6.8 | 45 | 28,600 | 6080 | 670 rpm |
| MBF 530 | Dispex N-40 | 4.4 | 45 | 3,920 | 1200 | 5.1 dynes |
| Silton | Calgon | 3.5 | 45 | 80 | 92 | 2.1 dynes |
| Reactive Pigment No. 1 | Calgon | 0.55 | 60 | 3,200 | 896 | 5.4 dynes |
| Reactive Pigment No. 1 | Dispex N-40 | 0.58 | 60 | 1,960 | 524 | 6.2 dynes |
| Reactive Pigment No. 2 | Calgon | 0.55 | 60 | 850 | 25 | 2.1 dynes |
| Reactive Pigment No. 2 | Dispex N-40 | 0.44 | 50 | 520 | 152 | 2.0 dynes |

TABLE X

| Sample | Dispersing Agent | Optical Density Immediate | % Redness | 20 mins. | % Redness | 1 hour | % Redness |
|---|---|---|---|---|---|---|---|
| MBF 530 | Calgon | 0.589 | 51.6 | 0.593 | 52.4 | 0.583 | 53.0 |
| MBF 530 | Dispex N-40 | | | | | 536 | 65.3 |
| Silton | Calgon | 0.501 | 77.6 | 0.501 | 80.0 | 0.481 | 82.1 |
| Reactive Pig. No. 1 | Calgon | 0.642 | 31.6 | 0.668 | 34.1 | 0.692 | 37.7 |
| Reactive Pig. No. 1 | Dispex N-40 | 0.684 | 35.2 | 0.694 | 36.7 | 0.715 | 38.9 |
| Reactive Pig No. 2 | Calgon | 0.574 | 28.2 | 0.588 | 27.5 | 0.649 | 32.7 |
| Reactive Pig. No. 2 | Dispex N-40 | 0.584 | 27.7 | 0.612 | 29.7 | 0.673 | 32.7 |

The image intensity is better for the reactive pigment when compared to the acid leached bentonites while the redness appears to be somewhat lower for the active clays.

I have also discovered that slurry stabilization and color intensity of the image can be effectively controlled by a combination of an inorganic (e.g. sodium hexametaphosphate) and an organic dispersant (e.g.

polyacrylate, sodium salts of bisulfite regulated oligomers, etc.).

The effect of dispersing agent on viscosity and optical density are set out in Tables XI and XII hereinbelow. In these tests the inorganic dispersant used was Calgon (sodium hexametaphosphate). The organic dispersants were Polywet ND-1 and Polywet ND-2, supplied by Uniroyal, Inc., and Dispex N-40, supplied by Allied Colloids.

Polywet ND-1 and ND-2 are sodium salts of a bisulfite regulated oligomer which only vary in molecular weight. The molecular weight of Polywet ND-1 is ca 1500, while Polywet ND-2 has a molecular weight of ca 1000. Dispex N-40 is a polyacrylate which has a molecular weight of approximately 5000.

The carbonless carbon pigment used in this investigation was formed using 0.9% $CuCl_2$ and 0.5% 1,6 hexanediamine.

The coating colors were made at 55% solids.

TABLE XI

| Dispersing Agent | | Brookfield Viscosity cps 10 RPM | 100 | Hercules dynes | Optical Density 20 mins. |
|---|---|---|---|---|---|
| Calgon | Imm. | 960 | 300 | 2.1 | 0.668 |
| Calgon | 24 hrs. | 1400 | 416 | 2.4 | |
| Polywet ND-1 | Imm. | 3160 | 824 | 4.1 | |
| Polywet ND-1 | 24 hrs. | 4480 | 1096 | 4.3 | 0.647 |
| Polywet ND-2 | Imm. | 640 | 210 | 2.3 | |
| Polywet ND-2 | 24 hrs. | 880 | 270 | 2.5 | 0.633 |
| Dispex N-40 | Imm. | 420 | 140 | 1.4 | |
| Dispex N-40 | 24 hrs. | 600 | 196 | 1.9 | 0.694 |

The use of Polywet ND-1 is of interest when thixotropy of a coating color is desired.

The Dispex N-40 results in the lowest viscosity and highest image intensity. The effect of Dispex N-40 and Calgon as dispersing agents as a function of time should be considered and the results are shown below using several different combinations of Calgon and Dispex N-40. The carbonless carbon pigment used in this study is composed of 25% montmorillonite, 75% GLOMAX JDF, 0.95% $H_2SO_4$ and 0.50% 1,6-hexanediamine.

The clay-water slips as well as the coating colors were aged for a period of up to 32 days at 50° C. The clay-water slips are at 55% solids, while the coating colors are at 50% solids.

TABLE XII

| | Brookfield Viscosity | | Elrepho 5400 Å |
|---|---|---|---|
| | Clay/Water 10 RPM cps | Coating Color cps | Optical Density 20 mins. |
| 100% Calgon | | | |
| Imm. | 3,000 | 700 | 0.606 |
| 1 day | 2,000 | 4,000 | 0.602 |
| 2 days | 12,500 | 6,100 | 0.573 |
| 3 days | 14,000 | 6,400 | 0.569 |
| 6 days | 12,000 | 5,800 | 0.585 |
| 10 days | 15,000 | 17,600 | 0.599 |
| 95% Calgon/5% N-40 | | | |
| Imm. | 4,400 | 1,800 | 0.559 |
| 1 day | 6,000 | 5,800 | 0.614 |
| 2 days | 5,400 | 3,600 | 0.583 |
| 3 days | 5,100 | 3,200 | 0.577 |
| 6 days | 4,700 | 2,600 | 0.590 |
| 10 days | 4,800 | 4,400 | 0.602 |
| 92% Calgon/8% N-40 | | | |
| Imm. | 4,700 | 2,200 | 0.590 |
| 1 day | 6,000 | 4,000 | 0.590 |
| 2 days | 4,800 | 2,600 | 0.578 |
| 3 days | 4,800 | 3,000 | 0.602 |
| 6 days | 5,500 | 3,200 | 0.585 |
| 10 days | 4,600 | 5,600 | 0.582 |
| 90% Calgon/10% N-40 | | | |
| Imm. | 3,500 | 1,100 | 0.567 |
| 1 day | 3,000 | 2,000 | 0.600 |
| 2 days | 4,200 | 2,300 | 0.569 |
| 3 days | 3,700 | 2,100 | 0.580 |
| 6 days | 3,600 | 1,800 | 0.583 |
| 10 days | 4,800 | 3,400 | 0.616 |
| 80% Calgon/20% N-40 | | | |
| Imm. | 4,800 | 2,000 | 0.558 |
| 1 day | 4,500 | 2,200 | 0.583 |
| 2 days | 5,600 | 2,400 | 0.578 |
| 3 days | 5,200 | 2,400 | 0.616 |
| 6 days | 5,500 | 2,000 | 0.595 |
| 10 days | 4,700 | 3,800 | 0.580 |
| 50% Calgon/50% N-40 | | | |
| Imm. | 3,800 | 1,400 | 0.607 |
| 1 day | 4,200 | 1,600 | 0.606 |
| 2 days | 5,200 | 2,000 | 0.592 |
| 3 days | 5,600 | 2,000 | 0.614 |
| 6 days | 6,200 | 2,100 | 0.606 |
| 10 days | 4,500 | 3,400 | 0.600 |
| 100% Dispex N-40 | | | |
| Imm. | 1,500 | 500 | 0.635 |
| 1 day | 2,400 | 800 | 0.656 |
| 2 days | 3,000 | 1,000 | 0.618 |
| 3 days | 2,800 | 1,000 | 0.631 |
| 6 days | 3,400 | 1,100 | 0.656 |
| 10 days | 5,000 | 1,200 | 0.636 |

The mixture of 90% Calgon (sodium hexametaphosphate) and 10% Dispex N-40 resulted in the optimum combination of slurry stabilization and development of image intensity. This mixture also results in excellent coating color stabilization. The optimum image intensity is developed with Dispex N-40.

While I have illustrated and described certain presently preferred embodiments and practices of my invention it will be understood that this invention may be otherwise embodied within the scope of the following claims.

I claim:

1. A reactive pigment for manifold copy systems consisting essentially of a mixture of a member from the group consisting of metal ions and hydrogen ion, a ligand, a member selected from the group consisting of bentonite and montmorillonite and a kaolinite.

2. A reactive pigment as claimed in claim 1 wherein the kaolinite is calcined kaolinite.

3. A reactive pigment as claimed in claim 1 wherein the ligand is 1,6-Hexanediamine.

4. A reactive pigment as claimed in claim 1 wherein the metal ion is Cu derived from $CuCl_2$.

5. A reactive pigment as claimed in claim 1 wherein the ratio of the member selected from the group montmorillonite and bentonite to kaolinite is 25% to 75%.

6. A reactive pigment as claimed in claim 1 wherein the ratio of the member selected from the group montmorillonite and bentonite to kaolinite is in the range 20% to 35% montmorillonite to 80% to 65% kaolinite.

7. A method of producing reactive pigments for manifold copy systems comprising the steps:

a. mixing a member from the group consisting of bentonite and montmorillonite with kaolinite in aqueous suspension,
b. adding to and dispersing in said mixture a member from the group metal ions and protons,
c. adding a ligand to and dispersing the same in the mixture of said member from the group consisting of bentonite and montmorillonite with kaolinite and a member from the group consisting of metal ions and hydrogen ion,
d. separating the solids, and
e. drying and pulverizing the solids.

8. The method of claim 7 wherein the kaolinite is a calcined kaolinite.

9. The method of claim 7 wherein the metal ion is Cu derived from $CuCl_2$.

10. The method of claim 7 wherein the ligand is 1,6-Hexanediamine.

11. The method of claim 7 wherein the mixture of a member from the group consisting of bentonite and montmorillonite and kaolinite are dispersed in aqueous solution with a mixture of inorganic and organic dispersing agents.

12. The method of claim 11 wherein the inorganic dispersing agent is sodium hexametaphosphate and the organic dispersing agent is a polyacrylate.

13. The method of claim 11 wherein the mixture of dispersing agents consists of about 90% sodium hexametaphosphate and about 10% of a polyacrylate having a molecular weight of about 5000.

14. The method of claim 11 wherein the ligand is 1,6-Hexanediamine.

15. The method of claim 11 wherein the metal ion is Cu derived from $CuCl_2$.

UNITED STATES PATENT OFFICE
CERTIFICATE OF CORRECTION

Patent No. 4,038,101　　　　　　　　　　Dated July 26, 1977

Inventor(s) THOMAS D. THOMPSON

It is certified that error appears in the above-identified patent and that said Letters Patent are hereby corrected as shown below:

Column 5, Table V, the Sample "Astra Plate" should read with the symbol ®.

Column 6, Table VI, the Sample "Gelwhite" should read with the symbol ®.

Column 8, Table IX, the % Solids for the Sample, Reactive Pigment No. 2 should read --60--.

*Signed and Sealed this*

*Eighth* Day of *November 1977*

[SEAL]

*Attest:*

RUTH C. MASON　　　　　LUTRELLE F. PARKER
*Attesting Officer*　　*Acting Commissioner of Patents and Trademarks*